United States Patent
Martina et al.

(10) Patent No.: US 9,821,647 B2
(45) Date of Patent: Nov. 21, 2017

(54) MOTOR-VEHICLE HYBRID POWERTRAIN UNIT

(71) Applicant: FCA Italy S.p.A., Turin (IT)

(72) Inventors: Bruno Martina, Turin (IT); Maurizio Delmonte, Turin (IT)

(73) Assignee: FCA Italy S.P.A., Turin (IT)

( * ) Notice: Subject to any disclaimer, the term of this patent is extended or adjusted under 35 U.S.C. 154(b) by 31 days.

(21) Appl. No.: 15/085,086

(22) Filed: Mar. 30, 2016

(65) Prior Publication Data
US 2016/0375755 A1 Dec. 29, 2016

(30) Foreign Application Priority Data

Jun. 25, 2015 (IT) .................. 102015000027575

(51) Int. Cl.
| | |
|---|---|
| *B60K 6/40* | (2007.10) |
| *B60K 1/02* | (2006.01) |
| *B60K 6/26* | (2007.10) |
| *B60K 17/04* | (2006.01) |
| *B60K 6/36* | (2007.10) |
| *B60K 6/24* | (2007.10) |
| *F01M 11/00* | (2006.01) |
| *B60K 6/442* | (2007.10) |
| *B60K 6/52* | (2007.10) |

(52) U.S. Cl.
CPC .................. *B60K 6/40* (2013.01); *B60K 6/24* (2013.01); *B60K 6/36* (2013.01); *B60K 6/442* (2013.01); *B60K 6/52* (2013.01); *F01M 11/0004* (2013.01); *B60K 6/26* (2013.01); *F01M 2011/0066* (2013.01); *F01M 2011/0083* (2013.01)

(58) Field of Classification Search
CPC ... B60K 6/40; B60K 1/02; B60K 6/26; B60K 6/405; B60K 17/04
See application file for complete search history.

(56) References Cited

U.S. PATENT DOCUMENTS

| | | | |
|---|---|---|---|
| 7,497,286 B2 * | 3/2009 | Keller ...................... | B60K 6/48 180/65.6 |
| 2007/0023211 A1 | 2/2007 | Keller et al. | |

FOREIGN PATENT DOCUMENTS

| | | |
|---|---|---|
| DE | 19954544 A1 | 8/2001 |
| DE | 102011018861 A1 | 10/2012 |
| EP | 1700729 A1 | 9/2006 |
| WO | 2010021413 A2 | 2/2010 |

OTHER PUBLICATIONS

Italian Search Report for Italian Application No. IT UB20151675 dated Nov. 6, 2015, 2 pages.

* cited by examiner

*Primary Examiner* — Bryan Evans
(74) *Attorney, Agent, or Firm* — RMCK Law Group, PLC

(57) ABSTRACT

A motor-vehicle hybrid powertrain unit comprises an internal combustion engine for driving the rear wheels of the motor-vehicle and one or two electric motors for driving the front wheels of the motor-vehicle. The internal combustion engine has an engine block below which there is provided no oil sump. The one or two electric motors are arranged immediately below the block of the internal combustion engine in the space, which in a conventional engine, is occupied by the oil sump.

10 Claims, 6 Drawing Sheets

MOTOR-VEHICLE HYBRID POWERTRAIN UNIT

CROSS REFERENCE TO RELATED APPLICATIONS

Figure 1:
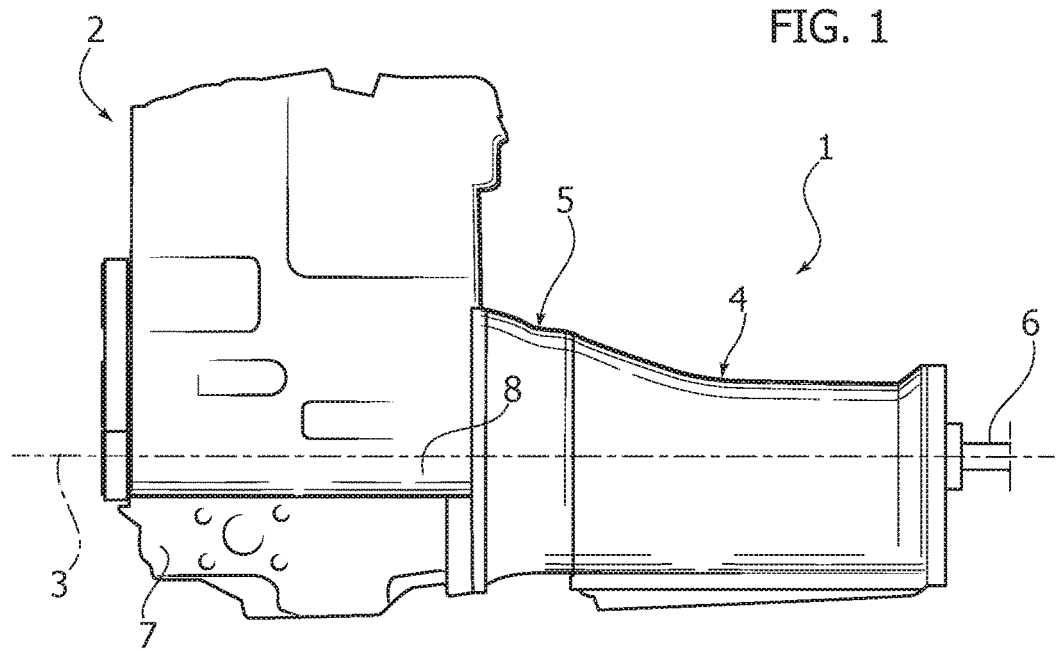

This application claims priority to Italian Patent Application No. 102015000027575 filed on Jun. 25, 2015, the entire disclosure of which is incorporated herein by reference.

FIELD OF THE INVENTION

The present invention relates to a motor-vehicle hybrid powertrain unit, comprising an internal combustion engine having a crankshaft for driving rotation of the rear wheels of the motor-vehicle and at least one electric motor for driving the front wheels of the motor-vehicle.

OBJECT OF THE INVENTION

The main object of the present invention is that of providing a hybrid powertrain unit of the above indicated type having an extremely simple and compact structure.

A particular object of the invention is that of providing a hybrid powertrain unit of the above indicated type which can be easily adapted also on a motor-vehicle originally designed with a powertrain unit of conventional type, including an internal combustion engine.

A further object of the invention is that of providing a hybrid powertrain unit which can be obtained starting from a conventional powertrain unit without substantially altering the dimensions thereof, in particular in the longitudinal direction of the motor-vehicle and in the vertical direction.

A further object of the invention is that of providing a hybrid powertrain unit which is simple and inexpensive to be manufactured and assembled.

SUMMARY OF THE INVENTION

In view of achieving the above indicated objects, the invention provides a hybrid powertrain unit of the above indicated type which is mainly characterized in that:
said internal combustion engine has an engine block below which there is provided no oil sump,
said at least one electric motor is arranged immediately below the engine block of the internal combustion engine, within the space which in conventional engines is occupied by the oil sump.

Internal combustion engines with no oil sump have been known since long. Elimination of the oil sump is possible by adopting a "dry sump" lubrication system, where the lubricating oil is contained within a separate reservoir, from which it is taken by a pump.

In the hybrid powertrain unit of the invention, the space which in a conventional internal combustion engine is occupied by the oil sump is used to house one or two electric motors for driving the front wheels of the vehicle.

In the preferred embodiment of the invention, two electric motors are provided having axes parallel or perpendicular to the axis of the crankshaft of the internal combustion engine and arranged spaced from each other in a plane substantially parallel to a bottom surface of the block of the internal combustion engine. Each electric motor has its output shaft connected to a respective front wheel of the motor-vehicle by a respective transmission. The two electric motors and the two transmissions associated thereto are contained within a transmission housing rigidly connected to the block of the internal combustion engine and arranged therebelow.

In the present description, and in the following claims, expressions such as "below the engine block" or "bottom surface of the engine block" are used with reference to one side of the engine block which is opposite to the cylinder head, i.e. the side of the engine block which faces downwardly in the condition installed on the vehicle.

Also in the case of the preferred embodiment, each transmission driving a respective front wheel includes:
a respective terminal shaft rotatably mounted within said transmission housing and adapted to be oriented along a direction transverse to the longitudinal direction of the motor-vehicle, for driving a respective front wheel of the motor-vehicle, and
a transmission for connecting the output shaft of the respective electric motor to said terminal shaft.

The transmission may comprise a gear transmission and/or an epicyclic transmission and/or a belt transmission.

In an exemplary embodiment, said transmission comprises at least one intermediate shaft, rotatably mounted within said transmission housing along an axis parallel and spaced apart with respect to the output shaft of the respective electric motor and connected to said respective terminal shaft by a pair of bevel gears. In one embodiment, the transmission comprises a first intermediate shaft connected to said terminal shaft by said pair of bevel gears and a second intermediate shaft, operatively interposed between said first intermediate shaft and the output shaft of the respective electric motor, said first intermediate shaft having an axis parallel to, and vertically spaced upwardly, with respect to the axis of said second intermediate shaft. As already indicated, the transmission can be also an epicyclic transmission or a belt transmission.

Again according to a further preferred feature, each transmission associated to a respective electric motor comprises a disengageable coupling device, which is controlled electrically or electro-hydraulically.

Finally, the invention also provides a motor-vehicle according to the annexed claim 10, provided with a hybrid powertrain unit of the above indicated type, in which the internal combustion engine is arranged with the axis of the crankshaft directed parallel to the longitudinal direction of the motor-vehicle and connected to a transmission shaft which drives the rear wheels of the motor-vehicle by means of a differential and wherein said at least one electric motor is arranged below the engine block of the internal combustion engine and drives the front wheels of the motor-vehicle, electronic control means being provided for controlling actuation and deactuation of the internal combustion engine and said at least one electric motor and/or for controlling a connection between said at least one electric motor and the motor-vehicle front wheels.

DESCRIPTION OF A PREFERRED EMBODIMENT

Figure 2:
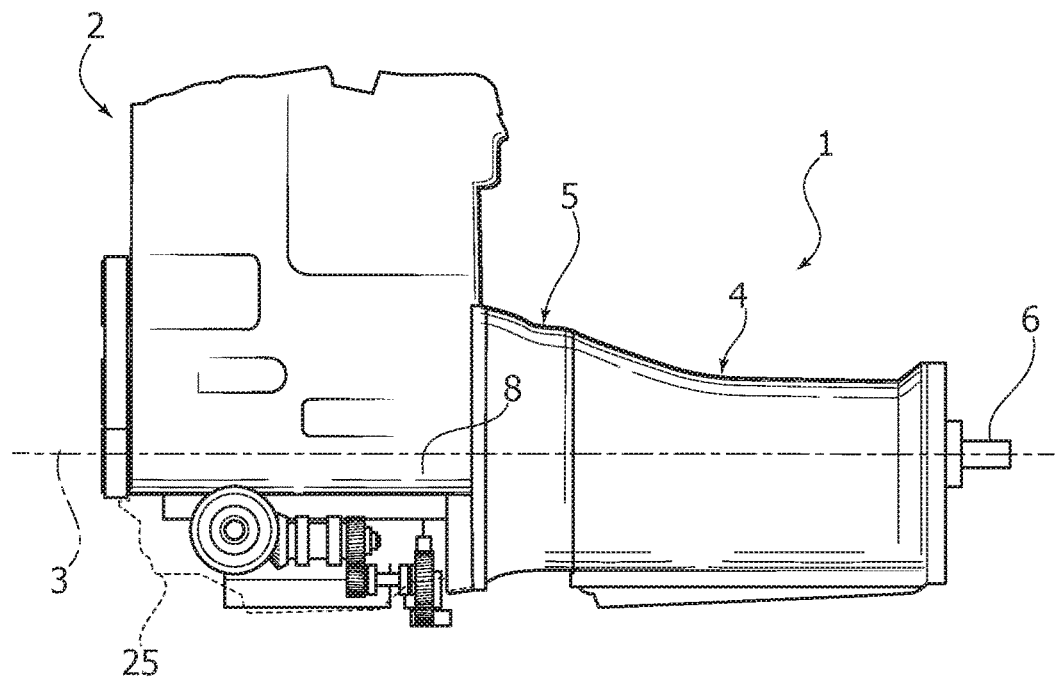
Figure 3:
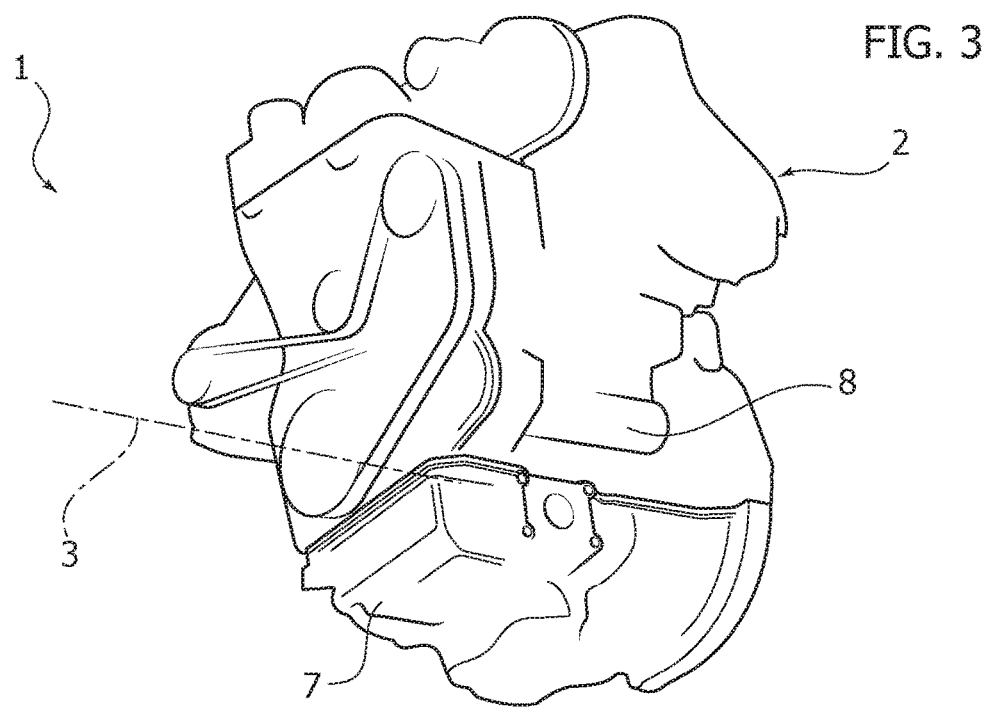
Figure 4:
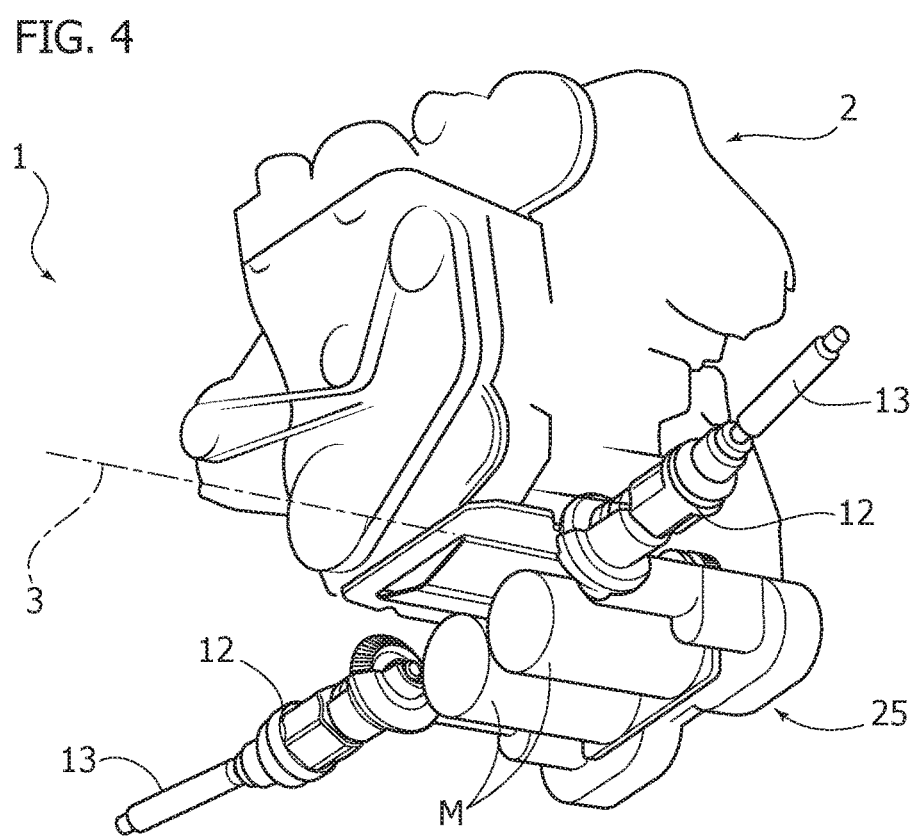
Figure 5:
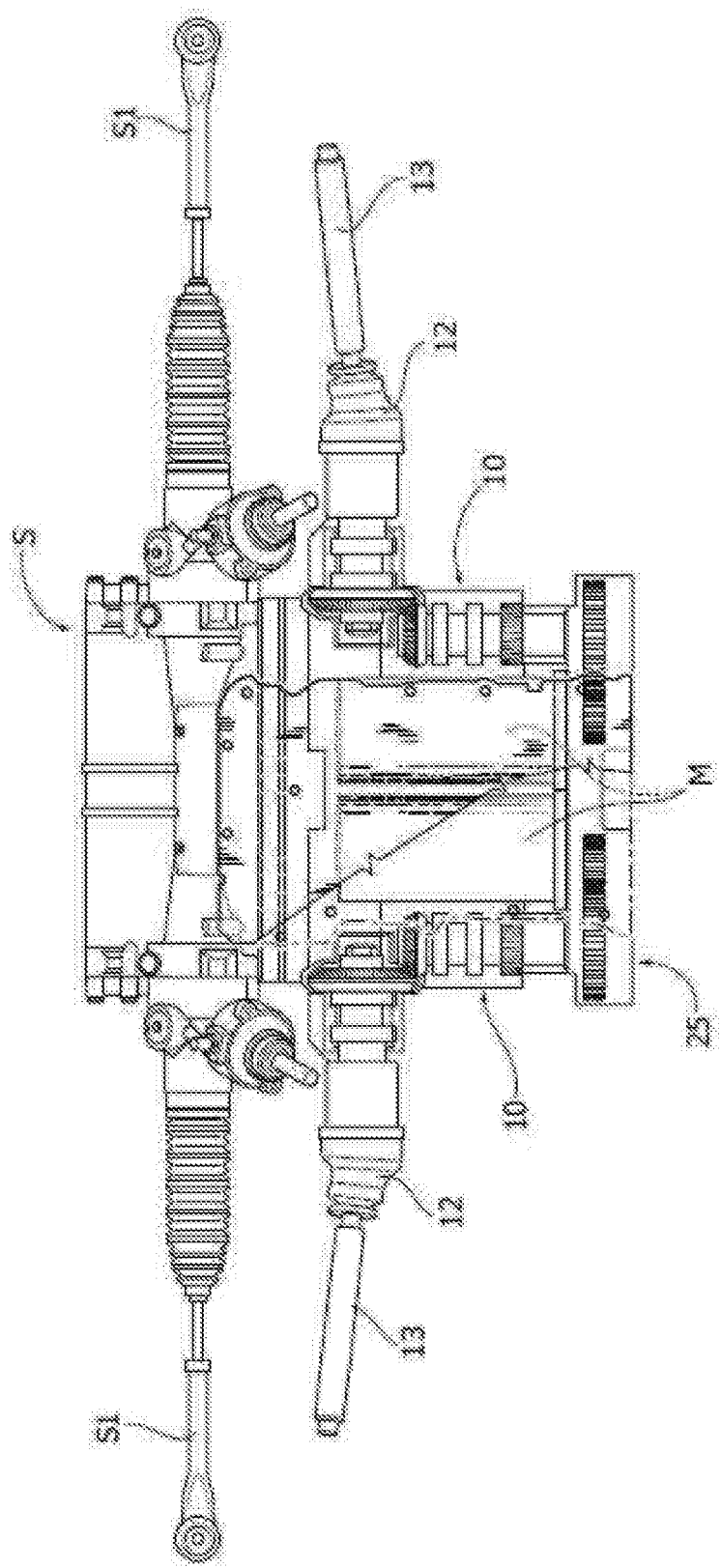
Figure 6:
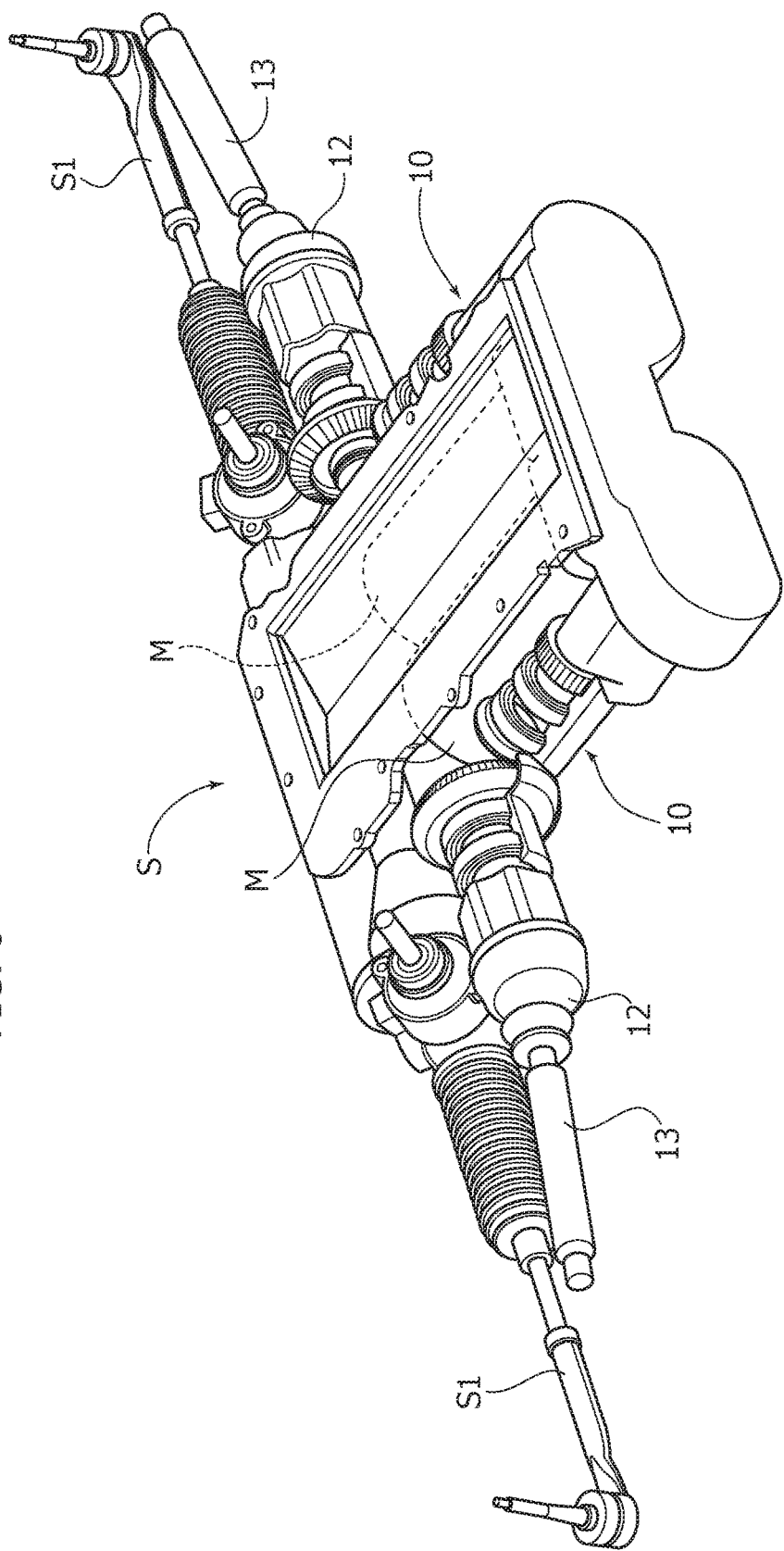
Figure 7:
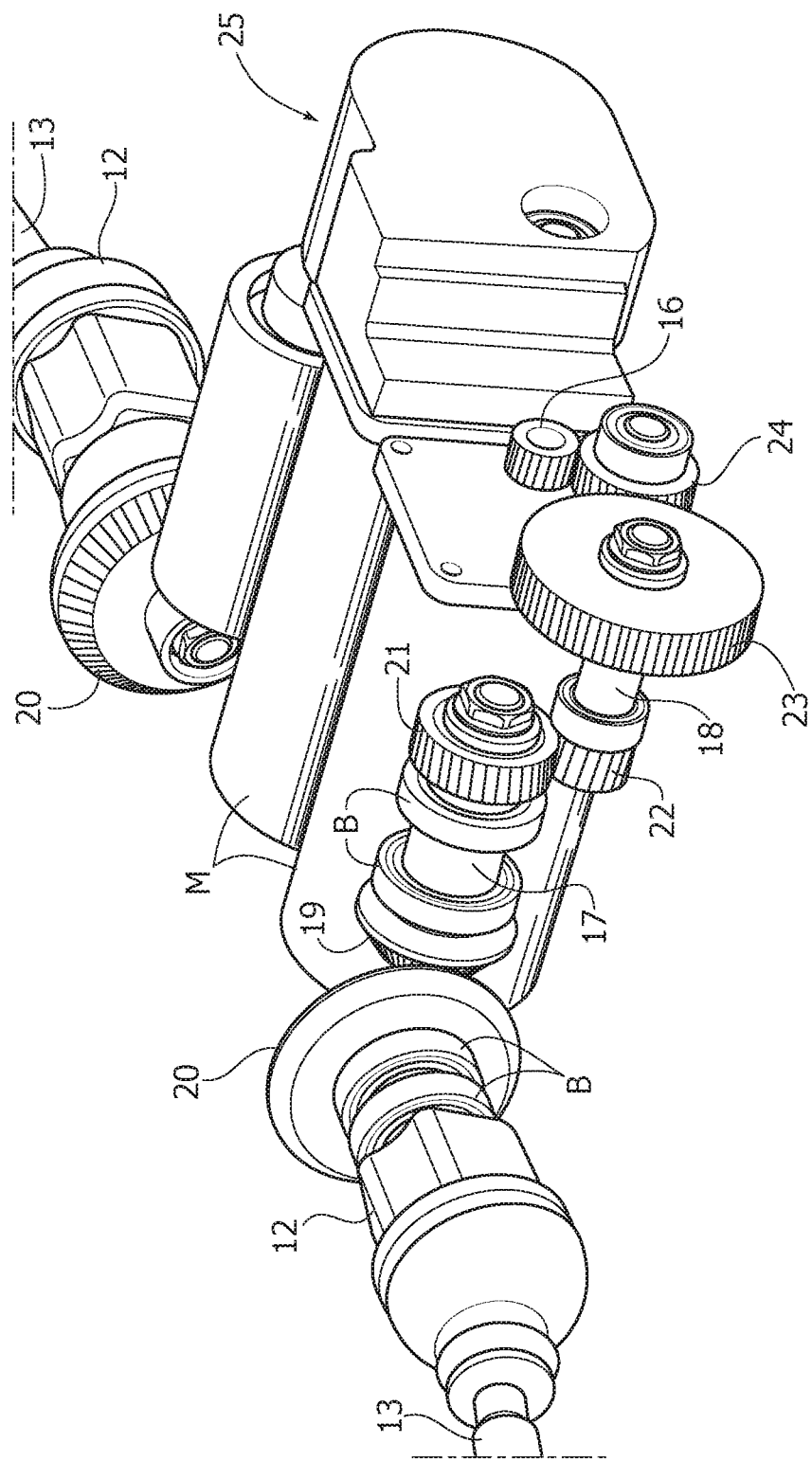
Figure 8:
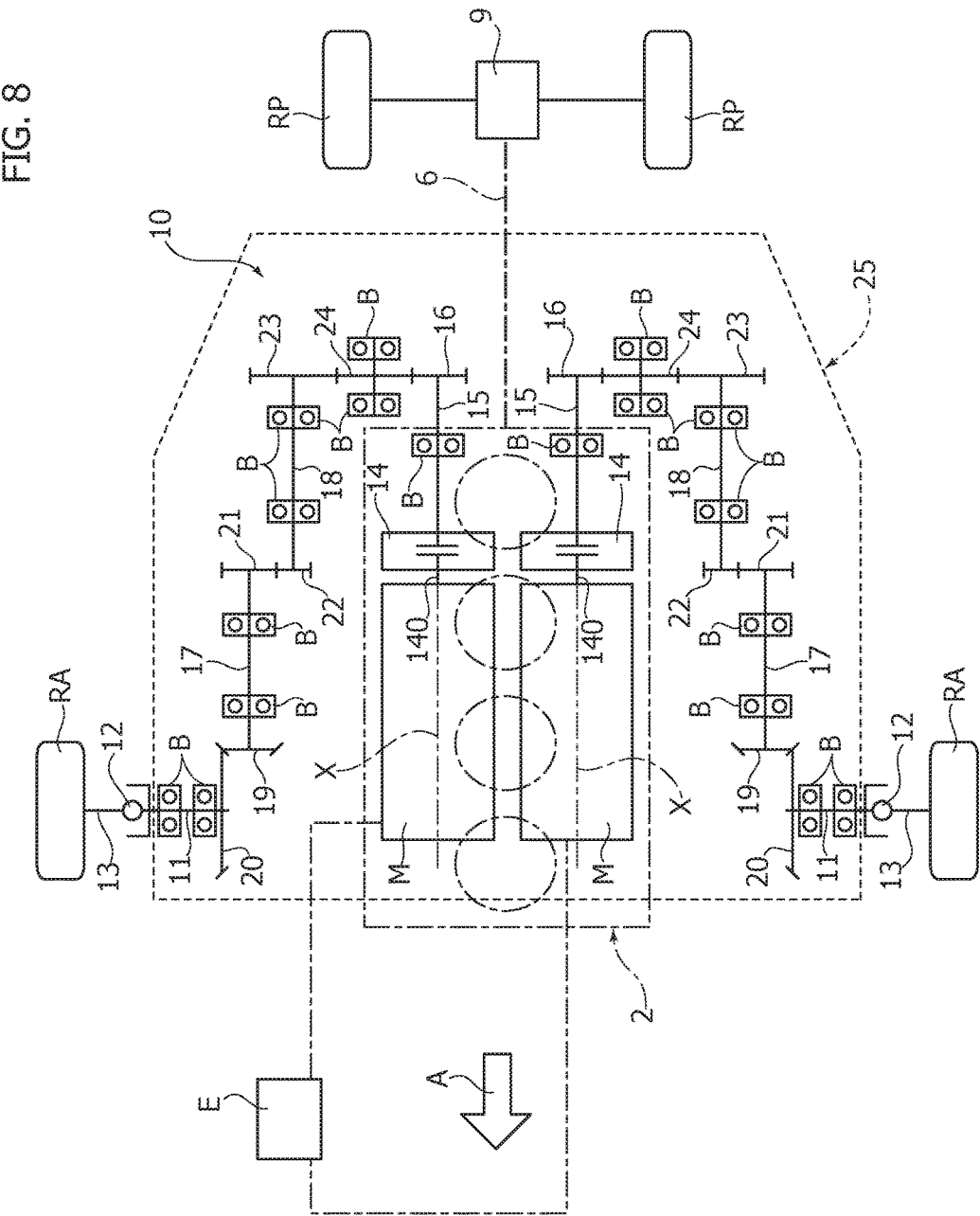

Further features and advantages of the invention will become apparent from the following description with reference to the annexed drawings, given purely by way of non limiting example, in which:

FIG. 1 is a diagrammatic lateral view of a powertrain unit according to the prior art, including an internal combustion engine of a conventional type, FIG. 2 is a lateral view similar to that of FIG. 1, which shows the powertrain unit of FIG. 1 transformed according to the teachings of the present invention, with a unit constituted by two electric motors for driving the motor-vehicle front wheels and the associated transmissions, this unit being arranged in the space which is occupied by the oil sump in the conventional engine of FIG. 1, FIGS. 3,4 are perspective views from below of the powertrain unit according to the prior art and the powertrain unit according to the invention (in FIG. 4 the housing of the unit including the two electric motors and the associated transmissions has been removed for clarity), FIGS. 5,6 and 7 are a view from above, a perspective view with some parts illustrated in transparency and a perspective view with the housing removed, of the unit of the two electric motors and the associated transmissions according to the present invention, and FIG. 8 is a diagram in plan view of the powertrain unit according to the invention.

With reference to FIGS. 1 and 3, numeral 1 generally designates a powertrain unit of a type known per se, including an internal combustion engine 2 having a crankshaft whose axis is designated by 3 and a gear change device 4, whose inlet is connected, in a conventional way, to the crankshaft by a friction clutch device 5 and whose outlet is connected to a transmission shaft 6.

The solution illustrated herein refers to an example in which the powertrain unit is to be positioned in the front part of a motor-vehicle, with axis 3 of the crankshaft directed parallel to the longitudinal direction of the motor-vehicle and with the transmission shaft 6 connected to a rear differential 9 of the motor-vehicle for driving the motor-vehicle rear wheels.

It is here to be noted that, for the purposes of the present invention, the structure and the general configuration of the internal combustion engine 2 and the gear change device 4 can be of any type, including the case of an engine with a completely automatic gear change, with no friction clutch or with an electric motor used in place of a conventional torque converter.

FIGS. 2, 4 show the same powertrain unit of FIGS. 1, 3, but modified according to the teachings of the present invention. In this respect, the sole relevant element with regard to the structure and the configuration of the internal combustion engine lies in that, in the case of the invention, an internal combustion engine is chosen of a type provided with a lubrication system with a "dry sump" (i.e. having a separate oil reservoir and a pump which takes the oil from this separate reservoir), so that the oil sump 7, which in the conventional engine of FIGS. 1, 3 is provided below the engine block 8, is thus eliminated. In the case of the powertrain unit according to the invention, the space which in the conventional engine is occupied by the oil sump 7 is used for arranging two electric motors M which are for driving the front wheels of the motor-vehicle.

It would be also possible to provide a single electric motor driving both the front wheels.

FIG. 8 of the annexed drawings shows a simplified diagram in plan view of a powertrain unit according to the invention.

In this figure, arrow A indicates the direction of advancement of the motor-vehicle. The internal combustion engine 2 is shown only diagrammatically and, in the case of the illustrated example, is an engine with four in-line cylinders (the invention is naturally applicable to any internal combustion engine, having one or more cylinders), oriented with its shaft parallel to the longitudinal direction of the motor-vehicle. As already indicated, the internal combustion engine 2 drives a rear differential 9 of the motor-vehicle through a longitudinal transmission shaft 6, for driving the rear wheels RP. The front wheels RA can be driven by means of the two electric motors M which are arranged side by side below the block 8 of the internal combustion engine, within the space which in a conventional engine is occupied by the oil sump. In the case of the illustrated example, the two electric motors M have their axes X directed parallel to the longitudinal direction of the motor-vehicle. However, it is also possible to provide the electric motors with their axes perpendicular to the longitudinal direction of the motor-vehicle. In one case and in the other, preferably the axes of the two electric motors are arranged in a plane substantially parallel to a lower surface of the engine block 8. The two electric motors M are connected by means of two respective transmissions 10 to two terminal shafts 11, directed transversally with respect to the longitudinal direction of the motor-vehicle, which on their turn are connected by Constant Velocity (CV) joints 12 to two axles 13 which drive the steering front wheels RA of the motor-vehicle. As an alternative to the example shown in the drawings, the transmissions 10 can be epicyclic gear transmissions or belt transmissions.

The electric motors M can be of any known type adapted to the use which is proposed here. The details of construction of these electric motors M are not described nor illustrated, since they can be of any known type and also because they do not fall, taken alone, within the scope of the present invention. The elimination of these details from the drawings also renders the latter simpler and easier to understand.

Also with reference to FIG. 8, each transmission 10 which connects each of the two electric motors M to the respective front wheel RA comprises a disengageable coupling device 14, of any known type, which can be actuated electrically, for example electromagnetically; the device 14 is interposed between the output shaft 140 of the respective electric motor M and a shaft 15 carrying a toothed wheel 16; or the device 15 can be inserted between the axle 13 and the wheel 20. Each toothed wheel 16 is connected by gears 23 and 24 to the respective terminal shaft 11, by means of a first intermediate shaft 17 and a second intermediate shaft 18. The shafts 17, 18 are oriented parallel to the longitudinal direction of the motor-vehicle. In one variant (not shown) this series of gears is replaced by an epicyclic gear transmission. Furthermore, as better visible in FIG. 7, the intermediate shaft 17 is in a vertically upwardly spaced position with respect to shaft 18. The first intermediate shaft 17 is connected to the respective terminal shaft 11 by a pair of bevel gears 19, 20. At the opposite end, shaft 17 is connected to the second intermediate shaft 18 by a pair of gears 21, 22. At its opposite end, each shaft 18 carries a toothed wheel 23 connected to the toothed wheel 16 of the respective electric motor M by means of a third toothed wheel 24 interposed therebetween. The shaft of wheel 24, the two intermediate shafts 17, 18, shaft 15 and the terminal shaft 11 of each of the two transmissions 10 are rotatably supported by rolling bearings B within a transmission housing 25 which is diagrammatically shown in FIG. 8 and which is shown sectioned in FIG. 6 and FIG. 2. Housing 25 contains the two electric motors M and the two transmissions 10 and is rigidly connected to the engine block 8, by means of screws.

FIGS. 5, 6 also show the steering device S, of a conventional type, which is provided on the motor-vehicle. This device actuates two steering tie rods S1 connected in a way known per se to supports carrying the front wheels RA, for actuating their steering movement.

In FIG. 8 an electronic control unit E is diagrammatically shown, for controlling the two electric motors M. The electronic unit E also controls actuation and deactuation of the coupling devices 14 which connect the electric motors M to the front wheels RA through the two transmissions 10.

In operation, the motor-vehicle can operate with rear drive only, by means of the internal combustion engine 2, or with an electric motor P4 in the case of automatic gear change, or with both front wheel drive and rear wheel drive, by activating both the internal combustion engine 2, or electric motor P4 in the case of automatic gear change, and the electric motors M.

The electronic control unit E and the control unit of the internal combustion engine control operation of the electric motors M and the internal combustion engine according to a predetermined logic, depending upon parameters indicative of the operating conditions of the internal combustion engine, the electric motors and the vehicle.

As it will be clearly apparent from the foregoing description, the adoption of an internal combustion engine with no oil sump 7 enables the two electric motors M forming part of the unit according to the invention to be housed within the space which in a conventional engine is occupied by the oil sump. The conventional powertrain unit can therefore be transformed easily into a hybrid powertrain unit according to the invention, without substantially modifying the dimensions of the powertrain unit and in particular without increasing the dimensions of the powertrain unit in the longitudinal direction of the motor-vehicle and in the vertical direction.

Naturally, while the principle of the invention remains the same, the details of construction and the embodiments may widely vary whit respect to what has been described and illustrated purely by way of example, without departing from the scope of the present invention.

What is claimed is:

1. A hybrid powertrain unit of a motor-vehicle, comprising an internal combustion engine for driving rear wheels of the motor-vehicle and at least one electric motor for driving front wheels of the motor-vehicle,
   said unit being characterized in that:
      said internal combustion engine has an engine block, below which there is provided no oil sump,
      said at least one electric motor is arranged immediately below the engine block of the internal combustion engine,
      said at least one electric motor has an output shaft connected to a transmission for controlling at least one front wheel of the motor vehicle, and
      said at least one electric motor and said transmission are contained within a transmission housing which is rigidly connected to the engine block of the internal combustion engine, said transmission housing being arranged below the engine block.

2. The hybrid powertrain unit according to claim 1, wherein said at least one electric motor comprises two electric motors having axes both parallel or both perpendicular to an axis of an engine shaft of said internal combustion engine, said axes of the two electric motors being arranged spaced apart from each other in a plane substantially parallel to a bottom surface of the engine block of the internal combustion engine.

3. The hybrid powertrain unit according to claim 2, wherein said transmission includes two transmissions, and wherein each electric motor is connected to a respective one of said two transmissions driving a respective front wheel of the motor-vehicle, said electric motors and said transmissions being arranged within said transmission housing,
   and wherein each of said transmissions includes:
      a respective terminal shaft rotatably mounted within said transmission housing and adapted to be oriented along a direction transverse to a longitudinal direction of the motor-vehicle, for driving the respective front wheel of the motor-vehicle, and
      a transmission portion for connecting the output shaft of the respective electric motor to said terminal shaft.

4. The hybrid powertrain unit according to claim 3, wherein each of said transmissions comprises a gear transmission and/or an epicyclic transmission and/or a belt transmission.

5. The hybrid powertrain unit according to claim 3, wherein each of said transmission portions comprises at least one intermediate shaft, rotatably mounted within said transmission housing on an axis parallel to, and spaced from, the output shaft of the respective electric motor and connected to said respective terminal shaft by a pair of bevel gears.

6. The hybrid powertrain unit according to claim 5, wherein said at least one intermediate shaft is connected to the output shaft of the respective electric motor by two or more gears or by an epicyclic gearing.

7. The hybrid powertrain unit according to claim 6, wherein said at least one intermediate shaft comprises a first intermediate shaft connected to said terminal shaft by said pair of bevel gears and a second intermediate shaft, operatively interposed between said first intermediate shaft and the output shaft of the respective electric motor, said first intermediate shaft having an axis parallel to, and vertically spaced upwardly, with respect to the axis of said second intermediate shaft.

8. The hybrid powertrain unit according to claim 7, wherein said second intermediate shaft carries a toothed wheel connected with a toothed wheel driven by the output shaft of the respective electric motor by a third toothed wheel interposed therebetween.

9. The hybrid powertrain unit according to claim 3, wherein each of said transmissions associated with a respective electric motor comprises an electrically controlled disengageable coupling device.

10. A motor-vehicle, wherein the motor vehicle comprises a hybrid powertrain unit according to claim 2, wherein the internal combustion engine is arranged with its engine shaft having its axis directed parallel to a longitudinal direction of the motor-vehicle, and connected to a transmission shaft which drives the rear wheels of the motor-vehicle by a differential, and wherein said at least one electric motor is arranged below the engine block of the internal combustion engine, and drives the front wheels of the motor-vehicle, an electronic control arrangement being provided for controlling actuation and deactuation of the internal combustion engine and said at least one electric motor and/or for controlling a connection between said at least one electric motor and the motor-vehicle front wheels.

* * * * *